(12) United States Patent
Swoboda et al.

(10) Patent No.: US 10,086,675 B2
(45) Date of Patent: Oct. 2, 2018

(54) ELECTRIC OR HYBRID MOTOR VEHICLE BODYWORK STRUCTURE, THIS VEHICLE, AND METHOD FOR CONTROLLING/MODIFYING THE TEMPERATURE OF THE PASSENGER COMPARTMENT THEREOF

(75) Inventors: Benjamin Swoboda, Bois le Roi (FR); Christophe Dominiak, Varennes-Changy (FR); Simon Karam, Voreppe (FR); Nadine Poupa-Parsigneau, Dordives (FR)

(73) Assignee: Hutchinson, Paris (FR)

( * ) Notice: Subject to any disclaimer, the term of this patent is extended or adjusted under 35 U.S.C. 154(b) by 704 days.

(21) Appl. No.: 13/614,767

(22) Filed: Sep. 13, 2012

(65) Prior Publication Data

US 2013/0062130 A1 Mar. 14, 2013

(30) Foreign Application Priority Data

Sep. 14, 2011 (FR) ...................... 11 58192

(51) Int. Cl.
*B60H 1/00* (2006.01)
*B60H 1/22* (2006.01)
*B60H 1/32* (2006.01)
*B60K 1/00* (2006.01)
*B60K 1/04* (2006.01)
*B60K 6/00* (2006.01)
*B62D 29/00* (2006.01)

(52) U.S. Cl.
CPC ..... *B60H 1/00492* (2013.01); *B60H 1/00271* (2013.01); *B60H 1/2215* (2013.01); *B60H 1/005* (2013.01); *B60H 1/22* (2013.01); *B60K 1/00* (2013.01)

(58) Field of Classification Search
CPC B60H 1/00492; B60H 1/005; B60H 1/00271; B60H 1/22; B60K 1/00
USPC ................................ 165/4, 41, 236
See application file for complete search history.

(56) References Cited

U.S. PATENT DOCUMENTS 3,567,906 A * 3/1971 Hurko ........................ 219/461.1
5,553,662 A * 9/1996 Longardner et al. ......... 165/202
(Continued)

FOREIGN PATENT DOCUMENTS

DE 10 2008 058 712 5/2010

*Primary Examiner* — Jianying Atkisson
*Assistant Examiner* — Joel Attey
(74) *Attorney, Agent, or Firm* — Alston & Bird LLP

(57) ABSTRACT

A bodywork structure for controlling or modifying the temperature of a passenger compartment of an electric or hybrid motor vehicle is provided. The bodywork structure includes at least one interior and exterior panel and one intermediate layer between the panels, each panel being based on a thermally conducting and electrically insulating material. The intermediate layer has at least one phase change material PCM and electric components coupled to it and is configured to be connected to an accumulator battery and which are able to convert the electrical energy available when the battery is being recharged into thermal energy stored by the PCM, so that the stored thermal energy is then transmitted to the interior of the vehicle when the latter is in use thanks to crystallizing of the at least one PCM, which is conversely able, by melting, to absorb an excess of heat inside the vehicle when this PCM is not recharged.

16 Claims, 1 Drawing Sheet

(56) References Cited

U.S. PATENT DOCUMENTS

| | | | |
|---|---|---|---|
| 6,059,016 A * | 5/2000 | Rafalovich et al. | 165/41 |
| 2004/0154784 A1 | 8/2004 | Pause | |
| 2004/0251244 A1* | 12/2004 | Torigoe | 219/208 |
| 2006/0124892 A1* | 6/2006 | Rolland et al. | 252/70 |
| 2009/0211732 A1* | 8/2009 | Goenka | 165/104.17 |
| 2010/0147500 A1* | 6/2010 | Minami | B23K 1/0012 165/173 |
| 2011/0127025 A1 | 6/2011 | Bohme et al. | |
| 2012/0187332 A1* | 7/2012 | Iruvanti et al. | 252/73 |

\* cited by examiner

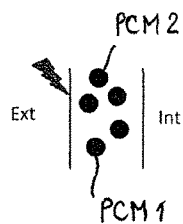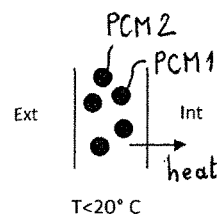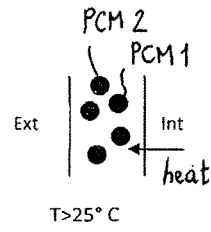
Fig. 1  Fig. 2  Fig. 3
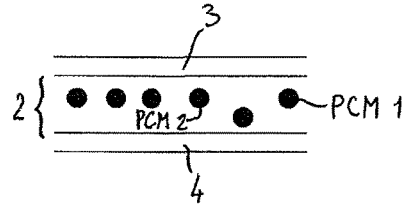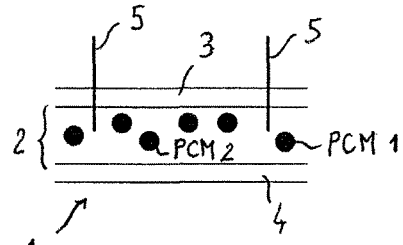
Fig. 4  Fig. 5
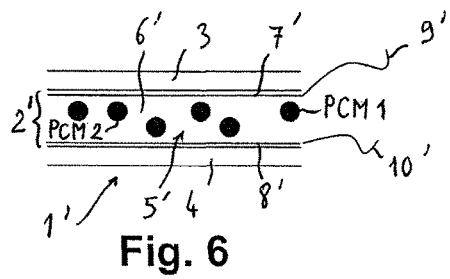
Fig. 6
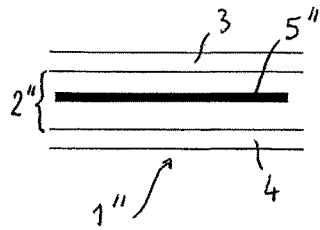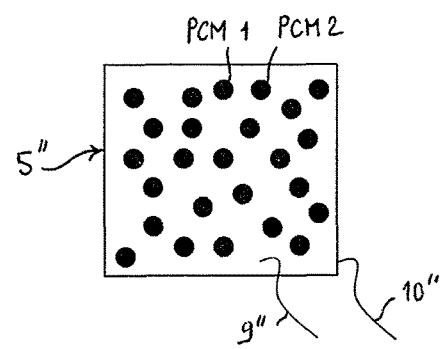
Fig. 7  Fig. 8

ELECTRIC OR HYBRID MOTOR VEHICLE BODYWORK STRUCTURE, THIS VEHICLE, AND METHOD FOR CONTROLLING/MODIFYING THE TEMPERATURE OF THE PASSENGER COMPARTMENT THEREOF

FIELD

The present invention relates to a bodywork structure of an electric or hybrid motor vehicle with an accumulator battery, this vehicle incorporating within its bodywork that delimits its passenger compartment at least one such structure and to a method for controlling or modifying the temperature of this passenger compartment.

BACKGROUND

There are three main categories of electrically powered motor vehicles (which means motor vehicles which are propelled at least in part using electrical energy):
- battery-powered electric vehicles, which operate exclusively using the electricity accumulated in an accumulator battery,
- hybrid vehicles, which are propelled by the energy produced by the combination of a combustion engine and an electric motor, and
- hydrogen-powered vehicles, which are also known as fuel cell vehicles.

In order to heat or cool the passenger compartment of battery-powered electric vehicles, currently use is generally made of climate control systems connected to the battery which have the disadvantage of operating only off this battery, placing a high demand on the accumulator cells and therefore appreciably reducing the range of these vehicles.

SUMMARY

It is an object of the present invention to propose a bodywork structure of an electric or hybrid motor vehicle with an accumulator battery, this structure comprising at least one interior panel, one exterior panel and one intermediate layer between these panels, these panels each being based on a thermally conducting and electrically insulating material, which overcomes this disadvantage while at the same time allowing a satisfactory control over the temperature of the passenger compartment of this vehicle.

To this end, such a bodywork structure according to the invention is characterized in that said intermediate layer comprises at least one phase change material PCM and electric components which are coupled to it and configured to be connected to the battery and which are able to convert the electrical energy available when this battery is being recharged into thermal energy stored by said at least one PCM, so that this stored thermal energy is then transmitted to the interior of the vehicle when the latter is in use thanks to the crystallizing of said at least one PCM, which is conversely able, by its melting, to absorb an excess of heat inside the vehicle when said at least one PCM is not recharged.

It will be noted that this/these PCM(s), such as hydrated salts or paraffins for example, have the advantage of changing from the liquid state to the solid state with a release of heat as they crystallize (exothermic and isothermal reaction), allowing the passenger compartment of the vehicle to be heated, and conversely of changing from the solid state to the liquid state absorbing heat as they melt (endothermic reaction), allowing this passenger compartment to be cooled. Further, according to the invention, the thermal energy obtained from the electrical energy derived from the battery is stored in this/these PCM(s) thanks to the latent heat of fusion that characterizes it/them, before being restored to the passenger compartment to heat it through the crystallizing of this/these PCM(s).

It should be noted that the electricity used by the bodywork structure according to the invention may be derived from the battery during recharging phases, as indicated above, but that as an alternative it may come directly from a mains outlet with which a building (a dwelling, industrial or commercial premises) is equipped in or next to which the vehicle is parked.

It will also be noted that it is possible to have a choice of one or more PCM material(s) to be used in the intermediate layer for transferring heat with the passenger compartment and that this/these PCM(s) can be used as desired in the form of microbeads defined by polymerized shells around PCM particles for example by using a sol-gel type technique (starting, for example from silanes or silanols), in the form of microcapsules incorporating an encapsulation that is either mineral (e.g. silica-based) or organic (e.g. based on a thermoplastic polymer for example obtained via radicals, such as methyl polymethacrylate, polystyrene or an acrylic polymer), or preferably in the form of powder with nodules dispersed in a preferably cellular thermoplastic matrix as indicated hereinafter with reference to a first embodiment of the invention.

It will further be noted that this (these) PCM(s) can be used in the pure form or alternatively in combination with:
- fillers (for example metallic or carbon-containing fillers, such as graphite, graphene or carbon nanotubes) in order to increase the thermal conductivity of the or each PCM, and/or
- flame retardants (e.g. those containing phosphor or halogens), and/or
- anti-ageing agents (e.g. UV stabilizers and antioxidants).

According to a first embodiment of the invention, said at least one PCM is dispersed for example by means of a twin-screw extruder in a polymer matrix, preferably a cellular one, the melting point of which is higher than that or those of this/these PCM(s), such as a cellular thermoplastic matrix for example based on a polypropylene, in order to obtain a sheet in calendered form.

According to a second embodiment of the invention, said at least one PCM is supported by a porous metal support, such as a microporous mesh or a metal foam (a "metal foam" means, in the known way, a cellular three-dimensional structure with very high porosity, for example in the form of a cushion which notably has a very high specific exchange area, and which is for example obtained by metalizing a polymer structure using electrodeposition). This fixing or attaching of the PCM(s) to the support can be performed either mechanically or chemically.

Thus, said at least one PCM may advantageously be incorporated into microcavities of a solid support or medium of cellular type that forms said intermediate layer, this cellular medium being formed by said cellular thermoplastic matrix in the aforementioned first embodiment and by said porous metal support in the aforementioned second embodiment.

According to another feature of the invention that is common to both embodiments, said components are of passive type and may comprise at least one electric resistor in contact with said at least one PCM and configured to be connected to the terminals of the battery.

According to this first embodiment of the invention, said at least one resistor may form a PTC thermistor with a positive temperature coefficient, with said at least one PCM which is dispersed in said polymer matrix comprising at least one PTC electrically conducting polymer and with two additional layers forming electrodes which are applied against and on either side of said intermediate layer being respectively configured to be connected to said terminals and which are each based on an electrically conducting plastic or else based on a metal layer.

As an alternative, said at least one resistor may be of metal type.

According to said first embodiment, said passive components may then comprise two said metal resistors to be connected respectively to said terminals which are arranged through said interior panel and emerge in said intermediate layer being in contact with said polymer matrix (which is preferably of cellular thermoplastic type) and with said at least one PCM dispersed therein.

Still according to this alternative form but according to said second embodiment of the invention, said at least one resistor may comprise a microporous metal foam or mesh which forms said support in said intermediate layer and in the microcavities of which said at least one PCM is fixed, this metal foam or mesh being configured to be connected to said terminals at two separate locations of this foam or mesh.

According to another feature of the invention, said interior panel and exterior panel may each be of plastic or of plastic matrix composite type and they may respectively have different thermal conductivities $\lambda_i$ and $\lambda_e$ where $\lambda_e > \lambda_i$, so as to encourage the transmission of heat from said at least one PCM to the interior of the vehicle, these panels for example being based on at least one polyolefin such as a polyethylene for example.

It will be noted that a bodywork structure according to the invention may include other plastic or composite layers in addition to said panels and to said intermediate layer, for example in order to fine tune this transmission of heat.

An electric or hybrid motor vehicle with an accumulator battery according to the invention comprises at least one bodywork structure as defined hereinabove which is connected to the terminals of said battery and which is preferably obtained by rotation molding, extrusion or injection molding. As an alternative, it is possible to conceive of casting or blow-molding methods via which to make these bodywork structures according to the invention.

Advantageously, this vehicle may incorporate several said bodywork structures substantially all around the passenger compartment it delimits, notably in walls of side doors, of a rear door and of a roof of the vehicle.

It will be noted that the high surface area that characterizes the bodywork of such a vehicle can be put to good use for heating or cooling the passenger compartment of the vehicle effectively, by using said intermediate layer which transfers heat with this passenger compartment (by releasing or absorbing heat as the case may be) using this (these) PCM(s) that the bodywork preferably incorporates over practically its entire wall area.

A method according to the invention for controlling or modifying the temperature of a passenger compartment of an electric or hybrid motor vehicle with an accumulator battery and a bodywork delimiting this passenger compartment, comprises:

a) while recharging the battery, converting the available electrical energy into thermal energy stored by at least one phase change material PCM that the bodywork comprises, this conversion being performed by electrical components, preferably passive ones, which are coupled to this (these) PCM(s) in the bodywork and which are electrically powered by the battery, and b) while the battery is discharging when the vehicle is in use, heating the passenger compartment by a release into the latter of the thermal energy stored in a) generated by the crystallization of said at least one PCM, a cooling of the passenger compartment being conversely obtained via an absorption of heat from the passenger compartment into this (these) PCM(s) generated by the melting of the latter.

It will be noted that this control over passenger compartment temperature using this (these) PCM(s) incorporated into the bodywork does not exclude the use, by way of main or secondary source, of a conventional climate control system connected to the battery of the vehicle.

BRIEF DESCRIPTION OF THE DRAWINGS

Other features, advantages and details of the present invention will become apparent from reading the following description of one exemplary embodiment of the invention given by way of nonlimiting illustration, this description being given with reference to the attached drawings among which:

FIG. 1 is a schematic view in cross section of the intermediate heat-transfer layer of a bodywork structure according to the invention, illustrating the principle of thermal energy storage using PCMs in this layer when the vehicle battery is being recharged, FIG. 2 is a schematic view in cross section of this intermediate heat transfer layer, illustrating the principle of the release of heat by this layer to the passenger compartment of the vehicle when this battery is discharging, in order to heat this passenger compartment, FIG. 3 is a schematic view in cross section of this intermediate heat transfer layer illustrating, conversely, the principle of the absorption by this layer of heat from this passenger compartment in order to cool it, FIG. 4 is a partial schematic view in cross section of part of a bodywork structure according to the invention including, between two, an interior and an exterior, panels, an intermediate heat transfer layer like those of FIGS. 1 to 3 showing these PCMs dispersed in a thermoplastic matrix according to the first embodiment of the invention, FIG. 5 is a schematic partial view in cross section of the bodywork structure of FIG. 4 also illustrating two metal electric resistors coupled to this intermediate heat transfer layer, FIG. 6 is a schematic partial view in cross section of a bodywork structure according to the invention according to an alternative form of FIG. 5, showing, instead of these resistors, a PTC thermistor comprising, between two electrodes, these PCMs dispersed in a PTC conducting polymer, FIG. 7 is a schematic partial view in cross section of a bodywork structure according to the invention according to another alternative form of FIG. 5, showing a metal mesh arranged in the intermediate layer forming a resistor and supporting these PCMs, and FIG. 8 is a schematic plan view of the metal support mesh of FIG. 7, showing these PCMs lodged in microcavities of this mesh.

DETAILED DESCRIPTION

These figures symbolically and solely by way of example depict a mixture of two PCMs, PCM 1, PCM 2 for the intermediate heat transfer layer 2, 2', 2" of a bodywork structure 1, 1', 1" according to the invention, it being remembered that such a layer 2, 2', 2" according to the invention could comprise just one PCM or a combination of more than two PCMs.

As illustrated in FIG. 1, a first step of the heat transfer method according to the invention is to convert electrical energy available when the battery is being charged or recharged into thermal energy stored by the PCMs PCM 1 and PCM 2 that the intermediate layer 2 included in the bodywork comprises between two panels, these respectively being an interior panel 3 and an exterior panel 4 thereof (these panels 3 and 4 are visible in FIGS. 4 to 7). This electrical/thermal conversion is performed by passive electric components 5, 5', 5" which are coupled to PCM 1 and PCM 2 in the intermediate layer 2, 2', 2" and which are connected to the terminals of the battery, as explained hereinafter, and this storage is rendered possible by the latent heat of fusion of said PCM 1 and PCM 2.

In a second step carried out while the battery is discharging when the vehicle is in use and symbolized in FIG. 2, the passenger compartment is heated by a release into the latter of the thermal energy stored by said PCM 1 and PCM 2, this release being brought about by their crystallization.

FIG. 3 symbolizes the reverse heat transfer which consists in said PCM 1 and PCM 2 absorbing an excess of heat in the passenger compartment in order to cool the latter, which absorption is generated by the melting of PCM 1 and PCM 2.

It is, for example, possible to use a PCM 1 and a PCM 2 the melting point of which is between 20° C. and 25° C., by way of nonlimiting illustration, providing for a release of heat by crystallization when the ambient temperature T is below 20° C. (typically in winter, which is the preferred scenario of FIGS. 1 and 2, with the abbreviations "Ext" and "Int" respectively denoting the spaces on the exterior and on the interior of the bodywork) and, on the other hand, an absorption of heat when this temperature T is above 25° C. (typically in the summer, the preferred case of FIG. 3).

FIG. 4 illustrates an example of a bodywork structure 1 according to the invention comprising an interior panel 3 facing toward the passenger compartment, an exterior panel 4 facing toward the exterior of the vehicle and this intermediate heat transfer layer 2, it being emphasized that these panels 3 and 4 are preferably each based on a thermally conducting and electrically insulating material such as a thermoplastic material or a thermoplastic matrix composite, for example based on a polyethylene. As for the thermoplastic matrix in which the PCMs PCM 1 and PCM 2 are dispersed, it is preferably cellular and, for example, based on a polypropylene.

In addition, FIGS. 5 to 8 illustrate exemplary embodiments of passive electrical components 5, 5', 5" capable of performing the aforementioned conversion of electrical energy into thermal energy in the intermediate layer 2, 2', 2" so that heat can be stored by PCM 1 and PCM 2, with:

in FIG. 5: the use for these components of two metal resistors 5 to be connected respectively to the positive and negative terminals of the battery, which are arranged through the interior panel 3 and emerge in the intermediate layer 2 in contact with the thermoplastic matrix containing PCM 1 and PCM 2;

in FIG. 6: the use for these components of a positive temperature coefficient PTC thermistor 5', with PCM 1 and PCM 2 dispersed in a PTC electrically conducting polymer 6' by way of thermoplastic matrix and with two flat electrodes 7' and 8' in the form of metal or electrically conducting plastic films which clamp this matrix 6' on both sides and which are connected to the positive and negative terminals of the battery via two connecting wires 9' and 10' respectively connected to the electrodes 7' and 8'; and in FIGS. 7 and 8: PCM 1 and PCM 2, instead of being dispersed in the aforementioned thermoplastic matrix, are supported by a porous metal structure formed, for example, of a microporous mesh 5" of small thickness that acts as a resistor and has microcavities accommodating PCM 1 and PCM 2, the mesh 5" being connected to the positive and negative terminals of the battery via two connecting wires 9" and 10" respectively connected to two separate locations on this mesh 5" (note that as an alternative the mesh 5" could, in this example, be replaced by a metal foam housing the PCM(s)).

The invention claimed is:

1. An electric or hybrid motor vehicle with an accumulator battery, comprising a bodywork structure delimiting a passenger compartment of said vehicle, this bodywork structure comprising at least one interior panel, one exterior panel and one intermediate layer between these panels, said layer and panels being stacked, said interior panel facing toward the passenger compartment and said exterior panel facing toward the exterior of the vehicle, said panels each being based on a thermally conducing and electrically insulating material, wherein said intermediate layer comprises at least one phase change material PCM and electric components which are coupled to said intermediate layer and configured to be connected to said battery and which are able to convert electrical energy available when said battery is being recharged into thermal energy stored by said at least one PCM, so that said stored thermal energy is then transmitted to the interior of the vehicle when the latter is in use due to crystallizing of said at least one PCM, which is conversely able, by its melting, to absorb an excess of heat inside the vehicle when said at least one PCM is not recharged, said electric components are of passive type and comprise at least one electric resistor in contact with said at least one PCM and are configured to be connected to terminals of the battery, wherein said bodywork structure is disposed in one or more side doors, rear doors, or a roof of the vehicle.

2. The electric or hybrid motor vehicle according to claim 1, wherein said at least one PCM is dispersed in a polymer matrix having a melting point of which is higher than that or those of said at least one PCM.

3. The electric or hybrid motor vehicle according to claim 2, wherein said polymer matrix is cellular.

4. The electric or hybrid motor vehicle according to claim 1, wherein said at least one PCM is supported by a porous metal support.

5. The electric or hybrid motor vehicle according to claim 4, wherein said support comprises a microporous mesh or a metal foam.

6. The electric or hybrid motor vehicle according to claim 1, wherein said at least one electric resistor is of the metal type.

7. The electric or hybrid motor vehicle according to claim 2, wherein said electric components are of passive type and comprise at least one electric resistor in contact with said at least one PCM and are configured to be connected to terminals of the battery and wherein said passive components comprise two metal resistors connected respectively to said terminals which are arranged through said interior and emerge in said intermediate layer being in contact with said polymer matrix and with said at least one PCM dispersed therein.

8. The electric or hybrid motor vehicle according to claim 3, wherein said electric components are of passive type and comprise at least one electric resistor in contact with said at least one PCM and are configured to be connected to terminals of the battery, and wherein said at least one electric resistor comprises a microporous metal foam or mesh which forms said support in said intermediate layer and having a plurality of microcavities of which said at least one PCM is fixed, said metal foam or mesh being configured to be connected to said terminals at two separate locations of this foam or mesh.

9. The electric or hybrid motor vehicle according to claim 2, wherein said electric components are of passive type and comprise at least one electric resistor in contact with said at least one PCM and are configured to be connected to terminals of the battery, and wherein said at least one resistor forms a PTC thermistor with a positive temperature coefficient, with said at least one PCM which is dispersed in said polymer matrix comprising at least one PTC electrically conducting polymer and with two additional layers forming electrodes which are applied against and on either side of said intermediate layer being respectively configured to be connected to said terminals and which are each based on an electrically conducting plastic or else based on a metal layer.

10. The electric or hybrid motor vehicle according to claim 1, wherein said interior panel and exterior panel comprise a plastic or plastic matrix composite material and respectively have different thermal conductivities $\lambda_i$ and $\lambda_e$ where $\lambda_e > \lambda_i$, so as to encourage the transmission of heat from said at least one PCM to the interior of the vehicle, wherein said panels comprise at least one polyolefin.

11. The electric or hybrid motor vehicle according to claim 10, wherein said at least one polyolefin comprises polyethylene.

12. The electric or hybrid motor vehicle according to claim 1, wherein said bodywork structure is connected to the terminals of a battery and which is obtained by rotation molding, extrusion or injection molding.

13. The electric or hybrid motor vehicle according to claim 12, wherein the motor vehicle incorporates several said bodywork structures substantially all around a passenger compartment that said vehicle delimits.

14. The electric or hybrid motor vehicle according to claim 13, wherein bodywork structures are disposed in walls of side doors, of a rear door and of a roof of the vehicle.

15. The electric or hybrid motor vehicle according to claim 1, wherein said interior panel and exterior panel comprise a plastic or plastic matrix composite material and respectively have different thermal conductivities $\lambda_i$ and $\lambda_e$ wherein $\lambda_e > \lambda_i$.

16. The electric or hybrid motor vehicle according to claim 1, wherein said intermediate layer comprises a mixture of two or more different PCMs.

* * * * *

UNITED STATES PATENT AND TRADEMARK OFFICE
CERTIFICATE OF CORRECTION

PATENT NO. : 10,086,675 B2
APPLICATION NO. : 13/614767
DATED : October 2, 2018
INVENTOR(S) : Swoboda et al.

Page 1 of 1

It is certified that error appears in the above-identified patent and that said Letters Patent is hereby corrected as shown below:

In the Claims

Column 6,
Line 26, "thermally conducing" should read --thermally conducting--.

Signed and Sealed this
Twenty-sixth Day of February, 2019

Andrei Iancu
*Director of the United States Patent and Trademark Office*